(12) United States Patent
Lederlin et al.

(10) Patent No.: US 11,841,140 B2
(45) Date of Patent: Dec. 12, 2023

(54) PRE-VAPORIZATION TUBE FOR A TURBINE ENGINE COMBUSTION CHAMBER

(71) Applicant: SAFRAN HELICOPTER ENGINES, Bordes (FR)

(72) Inventors: Thomas Jean Olivier Lederlin, Moissy-Cramayel (FR); Christophe Laurent, Moissy-Cramayel (FR); Guillaume Gerard Joel Mauries, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/766,602

(22) PCT Filed: Oct. 5, 2020

(86) PCT No.: PCT/FR2020/000247
§ 371 (c)(1),
(2) Date: Apr. 5, 2022

(87) PCT Pub. No.: WO2021/069808
PCT Pub. Date: Apr. 15, 2021

(65) Prior Publication Data
US 2023/0184438 A1 Jun. 15, 2023

(30) Foreign Application Priority Data
Oct. 8, 2019 (FR) ...................................... 1911137

(51) Int. Cl.
*F23R 3/28* (2006.01)
*F23R 3/32* (2006.01)

(52) U.S. Cl.
CPC ................ *F23R 3/32* (2013.01); *F23R 3/283* (2013.01); *F23R 3/286* (2013.01); *F23R 2900/03044* (2013.01)

(58) Field of Classification Search
CPC .................................... F23R 3/30; F23R 3/32
See application file for complete search history.

(56) References Cited

U.S. PATENT DOCUMENTS

| | | | | | |
|---|---|---|---|---|---|
| 2,956,404 | A | * | 10/1960 | Kassner | .................... F23R 3/32 60/738 |
| 3,579,983 | A | * | 5/1971 | Caruel | ..................... F23R 3/06 60/738 |

(Continued)

FOREIGN PATENT DOCUMENTS

| | | |
|---|---|---|
| CN | 107676816 A | 2/2018 |
| CN | 109340822 A | 2/2019 |

(Continued)

OTHER PUBLICATIONS

International Search Report dated Jan. 19, 2021, issued in corresponding International Application No. PCT/FR2020/000247, filed Oct. 5, 2020, 6 pages.

(Continued)

*Primary Examiner* — William H Rodriguez
(74) *Attorney, Agent, or Firm* — CHRISTENSEN O'CONNOR JOHNSON KINDNESS PLLC

(57) ABSTRACT

A pre-vaporisation tube for a turbine engine combustion chamber includes a main body ROOM defining a first inner duct configured to have an injector mounted therein. The tube includes a first end attached to a wall of the chamber, and at least two end pieces are arranged at a second end of the body and define second inner ducts. The end pieces include first portions and second portions, respectively. The second portions each include two coaxial cylindrical walls which are inner and outer coaxial cylindrical walls, respectively, and which define an annular cavity therebetween. The inner wall defines an inner passage and has first openings for fluid communication between the passage and the annular cavity.

17 Claims, 4 Drawing Sheets

(56) References Cited

U.S. PATENT DOCUMENTS

| | | | | |
|---|---|---|---|---|
| 3,626,444 | A | * | 12/1971 | Caruel ................ F23R 3/32 60/738 |
| 3,633,361 | A | * | 1/1972 | Bauger ................ F23R 3/32 60/761 |
| 3,757,522 | A | * | 9/1973 | Caruel ................ F23R 3/32 60/738 |
| 3,869,865 | A | * | 3/1975 | Lacroix ................ F23R 3/32 239/132.3 |
| 3,913,318 | A | * | 10/1975 | Fox ................ F23R 3/32 60/738 |
| 4,085,581 | A | * | 4/1978 | Caruel ................ F23R 3/002 60/738 |
| 4,188,782 | A | * | 2/1980 | Smith ................ F23R 3/32 60/733 |
| RE30,925 | E | * | 5/1982 | Smith ................ F23R 3/32 60/733 |
| 4,742,684 | A | * | 5/1988 | Sotheran ................ F23R 3/32 60/738 |
| 5,133,192 | A | * | 7/1992 | Overton ................ F23D 11/005 60/738 |
| 5,651,252 | A | * | 7/1997 | Ansart ................ F23R 3/32 60/737 |
| 10,767,865 | B2 | * | 9/2020 | Roesler ................ F23R 3/286 |
| 2017/0074521 | A1 | | 3/2017 | Horikawa et al. |
| 2017/0356657 | A1 | * | 12/2017 | Roesler ................ F23R 3/14 |

FOREIGN PATENT DOCUMENTS

| | | |
|---|---|---|
| EP | 3 150 918 A1 | 4/2017 |
| FR | 2 189 630 A1 | 1/1974 |
| FR | 2 730 555 A1 | 8/1996 |

OTHER PUBLICATIONS

Written Opinion dated Jan. 19, 2021, issued in corresponding International Application No. PCT/FR2020/000247, filed Oct. 5, 2020, 5 pages.

English translation of Written Opinion dated Jan. 19, 2021, issued in corresponding International Application No. PCT/FR2020/000247, filed Oct. 5, 2020, 4 pages.

International Preliminary Report on Patentability dated Apr. 12, 2022, issued in corresponding International Application No. PCT/FR2020/000247, filed Oct. 5, 2020, 6 pages.

Chinese First Office Action dated Feb. 8, 2023, issued in corresponding Chinese Patent Application No. 202080070519.0, filed Oct. 5, 2020, 2 pages.

* cited by examiner

Fig. 1 - prior art -
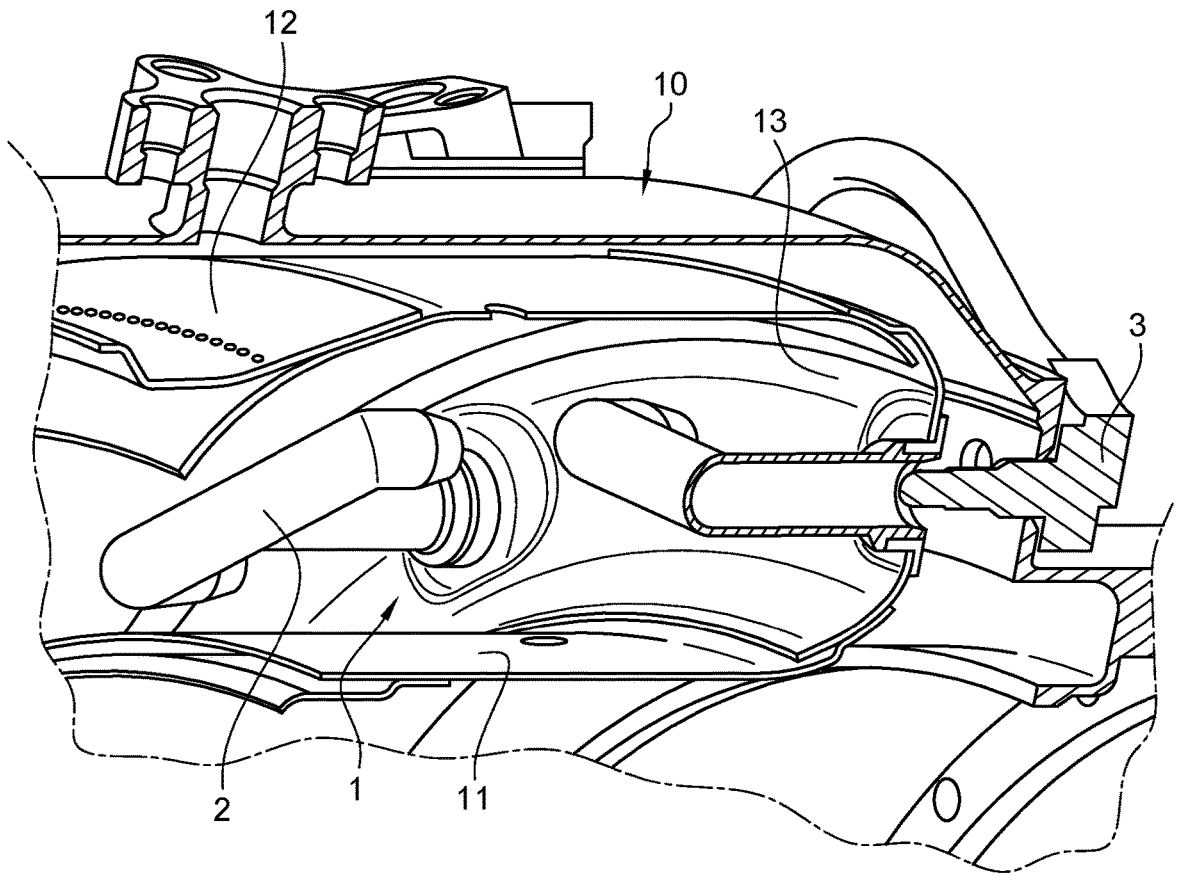
Fig. 2 - prior art -
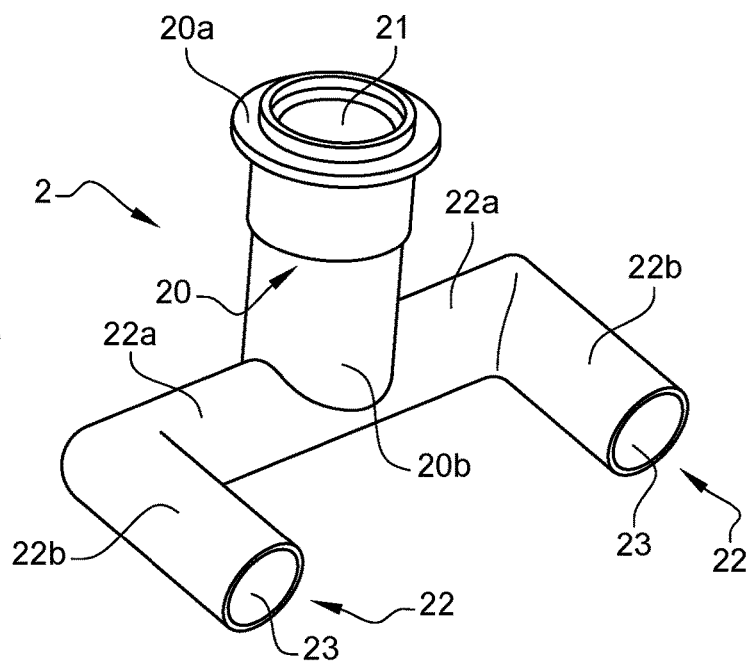

PRE-VAPORIZATION TUBE FOR A TURBINE ENGINE COMBUSTION CHAMBER

FIELD OF THE DISCLOSURE

The present disclosure relates particularly to a pre-vaporization tube for a turbine engine combustion chamber, in particular for an aircraft.

BACKGROUND

The prior art comprises, in particular, the documents FR-A2-2 181 579 and FR-A1-3 013 805.

Generally, an aircraft turbine engine comprises a gas generator comprising in particular one or more compressors, for example low pressure and high pressure, arranged upstream of a combustion chamber.

By convention, in this demand, the terms "upstream" and "downstream" are defined in relation to the flow direction of a gas flow, in particular in the turbine engine. Also, by convention in this demand, the terms "internal" and "external" are defined radially with respect to a longitudinal axis, in particular of the turbine engine.

In reference to FIG. 1, a turbine engine typically comprises a combustion chamber 1 that is surrounded by an annular chamber casing 10. The chamber 1 is delimited by coaxial internal 11 and external 12 annular walls joined upstream by an annular bottom wall 13 of the chamber 1. The external wall 12 is fixed to the casing 10 which carries an annular row of fuel injectors 3 so as to supply the chamber 1 with a mixture of air and fuel. The chamber 1 is here equipped with pre-vaporization tubes 2 which are each associated with a fuel injector 3. The tubes 2 are here mounted on the bottom wall 13 of the chamber 1.

Each tube 2, such as the one shown in FIG. 2, comprises a main body 20 with generally elongated shape and connected to two bent arms or end pieces 22.

The main body 20 defines a first internal longitudinal conduit 21 in which the fuel injector 3 is mounted. This main body 20 comprises a first longitudinal end 20a for attachment to one of the walls 13 of the chamber 1 and a second longitudinal end 20b.

The end pieces 22 are each located at the level of the second longitudinal end 20b and define second internal conduits 23. The end pieces 22 each comprise a first portion 22a which is in fluid communication with the first conduit 21 and a second portion 22b which is intended to open into the chamber 1.

When a combustion takes place in the chamber 1, the walls of the tube 2 heat up and the fuel, projected by the injector 3 on the walls of the tube, evaporates. The air-fuel mixture enters the chamber 1 through the end pieces 22 of the tube 2.

The function of such a pre-vaporization tube is therefore to deliver a calibrated flow rate of air-fuel mixture into a primary area arranged upstream of the chamber.

During certain operating manoeuvres of the turbine engine (for example: a cold start or a fast acceleration) when a large flow rate of fuel is supplied, the tube is naturally cooled by the air-fuel mixture circulating inside the tubes, in particular through the first and second internal conduits. The rich fuel mixture feeding into the chamber through the tube also allows to make the flame (produced during combustion) more stable and better adapted to the shape of the combustion chamber.

However, on some abrupt deceleration manoeuvres, the flame production during combustion can reach the end pieces of the tubes and damage them (e.g. by burning and/or cracking).

The degradation of the tubes can be slowed down by the use of materials that are increasingly resistant to high temperatures. However, this requires very precise control of the material and the dimensions of the tubes during their design, which generates significant manufacturing and control costs.

In general, the thermal environment (gas combustion chamber) in which the tubes are located causes their progressive degradation. The insufficient cooling of the end pieces of the tubes can therefore reduce their service life and affect the performance of the combustion chamber.

In this context, it is interesting to overcome the disadvantages of the prior art, by proposing a solution for reliable cooling and improved service life of the pre-vaporization tubes of a turbine engine combustion chamber.

SUMMARY

The present disclosure provides a simple, effective and economical solution to the aforementioned disadvantages of the prior art.

To this end, the disclosure proposes a pre-vaporization tube for combustion chamber of a turbine engine, in particular for an aircraft, comprising:
- a main body of generally elongated shape and defining a first internal longitudinal conduit wherein a fuel injector is intended to be mounted, the main body comprising a first longitudinal end for fastening to a wall of the combustion chamber and a second longitudinal end,
- at least two end pieces arranged at the level of the second longitudinal end and defining second internal conduits, the end pieces respectively comprising first portions which are substantially coaxial and diametrically opposed and second portions which are substantially parallel and oriented in a same direction, the first portions being in fluid communication with the first conduit and the second portions being intended to open into the chamber.

According to the disclosure, the second portions each comprise two coaxial cylindrical walls, respectively internal and external, which define between them an annular cavity. The internal wall defines an internal passage and comprises first orifices for placing this passage in fluid communication with the annular cavity.

Such a configuration allows the walls of the end pieces arranged in the primary area of the combustion chamber to be cooled efficiently, while ensuring the stability of the flame leaving the end pieces in the chamber. The cooling system according to the disclosure consists in implementing a double wall around the end pieces. This double wall is supplied with air-fuel mixture through the orifices of the internal wall. The external wall is thus cooled by the impact of air jets formed by the passage of the air-fuel mixture through the orifices of the internal wall. Indeed, a pressure gradient is generated during the passage and the circulation of the air-fuel mixture in the annular cavity of the double wall. This pressure gradient allows the formation of the air jets that cool the external wall of the end pieces. The main body and the first portions of the end pieces of the disclosure are made and operate in the same way as a conventional tube, so as to ensure the pre-vaporization function.

The disclosure therefore has the advantage of offering a simple design, offering a very high reliability, and with little penalty in terms of cost and overall dimension of the combustion chamber.

According to a particularity of the disclosure, the internal wall is connected at its longitudinal end opposite to the first portions, to a transverse wall comprising second fluid passage orifices. The addition of this transverse wall pierced with orifices allows to obstruct at least partially the internal section of the end pieces, which generates a pressure drop during the passage of the air-fuel mixture through the orifices of this transverse wall at the outlet of the end pieces. This improves the impact of air jets at the passage of the orifices in the internal wall.

The pre-vaporization tube according to the disclosure may comprise one or more of the following characteristics, taken alone or in combination with each other:
- the annular cavity has an annular shaped air outlet section,
- the transverse wall extends in line with a free longitudinal end of the external wall,
- the internal and external walls are connected to each other by a frustoconical wall, on the side of the first portions,
- the first orifices are inclined, from upstream to downstream, radially outwards with respect to a flow direction of fluid in the second portions and with respect to the longitudinal axes of the second portions,
- the annular cavity further comprises a plurality of fluid flow disruptors, such as channels, spikes, and/or fins,
- the disruptors extend radially between the internal and external walls,
- the disruptors are regularly distributed around the longitudinal axes of the second portions,
- the disruptors are each located between two adjacent first orifices,
- the external wall and the transverse wall are at least partially coated with a ceramic material,
- the end pieces are bent or unbent,
- the second internal conduits are bent or unbent,
- the end pieces are bent substantially at right angles,
- the second portions comprising the external walls each have an external diameter greater than the external diameter of the first portions, respectively.

The disclosure also relates to a combustion chamber of a turbine engine, in particular for an aircraft, comprising at least one pre-vaporization tube as described above.

The disclosure also relates to a turbine engine, in particular for an aircraft, comprising a combustion chamber equipped with at least one pre-vaporization tube as described above.

The turbine engine may be a turboprop engine or a turbojet engine.

DESCRIPTION OF THE DRAWINGS

The disclosure will be better understood and other details, characteristics and advantages of the present disclosure will become clearer from the following description made by way of non-limiting example and with reference to the attached drawings, in which:

FIG. 1 is a partial schematic perspective view of a turbine engine combustion chamber, equipped with pre-vaporization tubes.

FIG. 2 is a schematic perspective view of a pre-vaporization tube according to the prior art.

DETAILED DESCRIPTION

FIGS. 1 and 2 have been described in the foregoing and show an example of a pre-vaporization tube 2 for a turbine engine combustion chamber 1 according to the prior art.

Figure 3A:
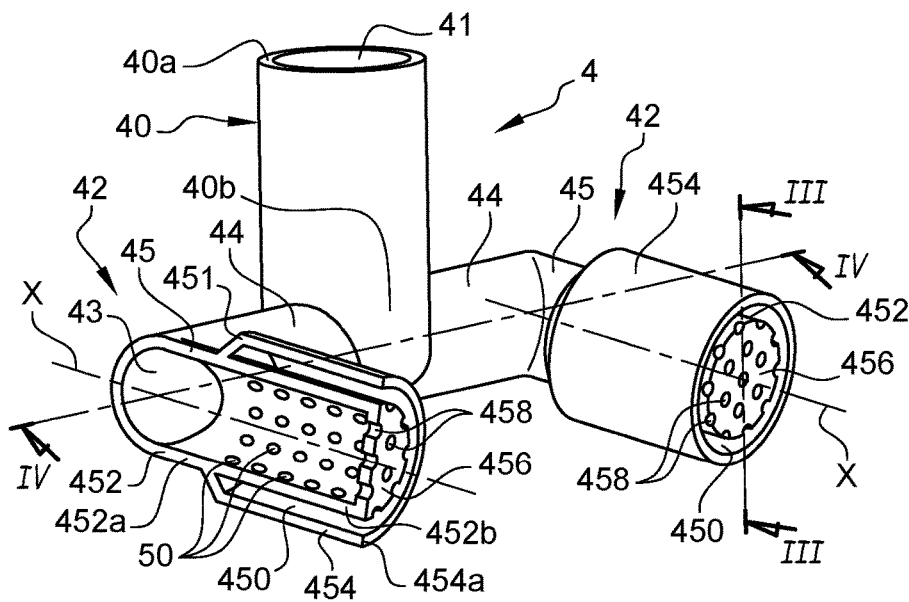
FIG. 3*a* is a schematic perspective view of a pre-vaporization tube according to a first embodiment of the disclosure, one of the end pieces of which is shown sectioned along a sectional plane III-III.
Figure 3B:
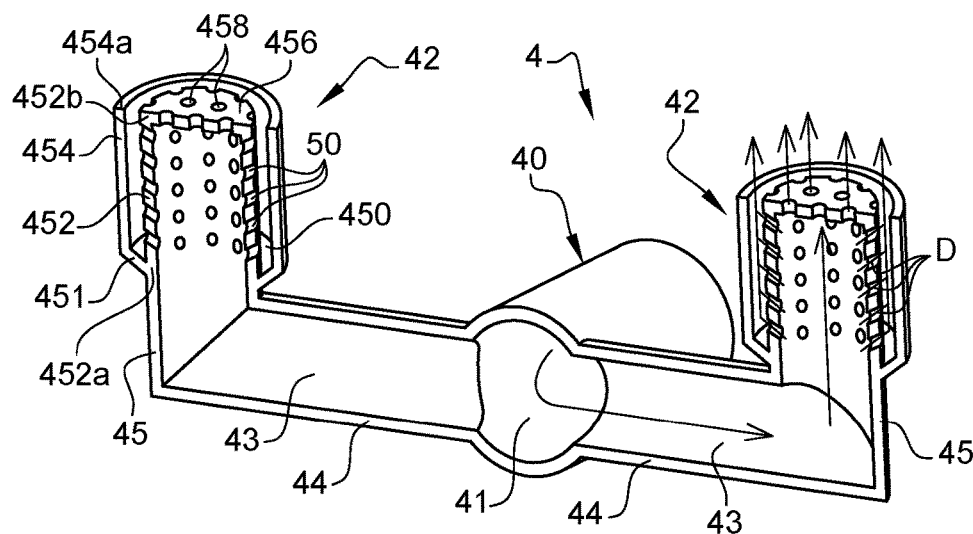
FIG. 3*b* is a schematic perspective view of the tube in FIG. 3*a*, the end pieces of which are shown along a sectional plane IV-IV of FIG. 3*a*.
Figure 3C:
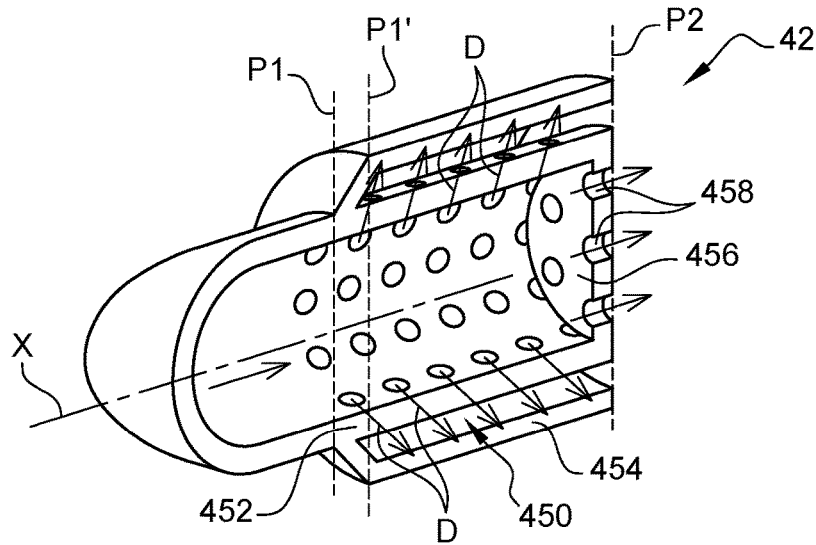
FIG. 3*c* is an enlarged view of a portion of the end piece in FIG. 3*a*.
Figure 4A:
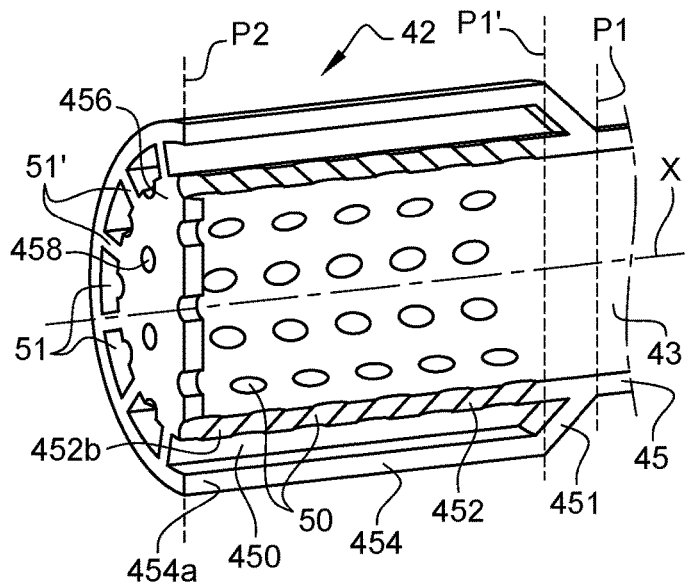
FIG. 4*a* is a partial schematic view in axial section of an end piece of a tube according to a second embodiment of the disclosure.
Figure 4B:
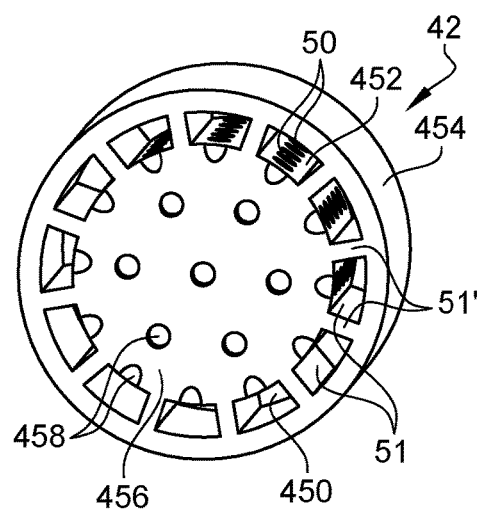
FIG. 4*b* is a schematic front perspective view of the end piece in FIG. 4*a*.
Figure 5A:
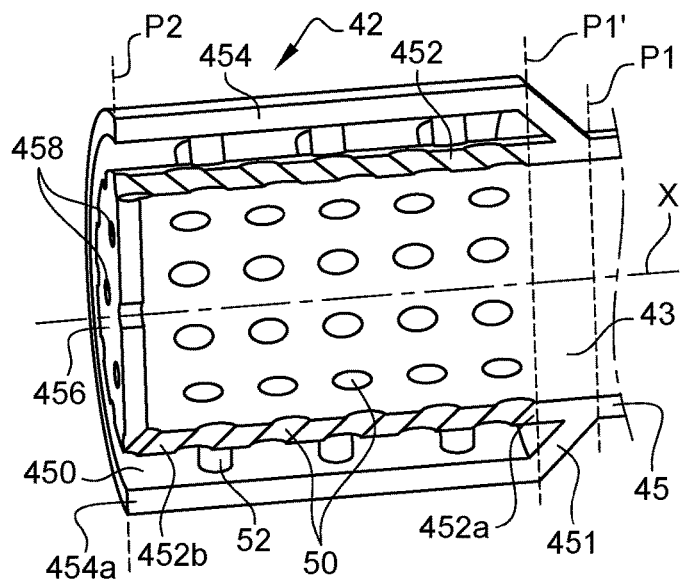
FIG. 5*a* is a partial schematic view in axial cross-section of an end piece of a tube according to a third embodiment of the disclosure.
Figure 5B:
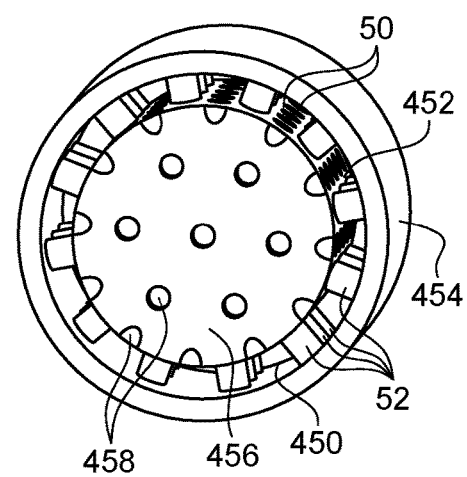
FIG. 5*b* is a schematic front perspective view of the end piece in FIG. 5*a*.
Figure 6A:
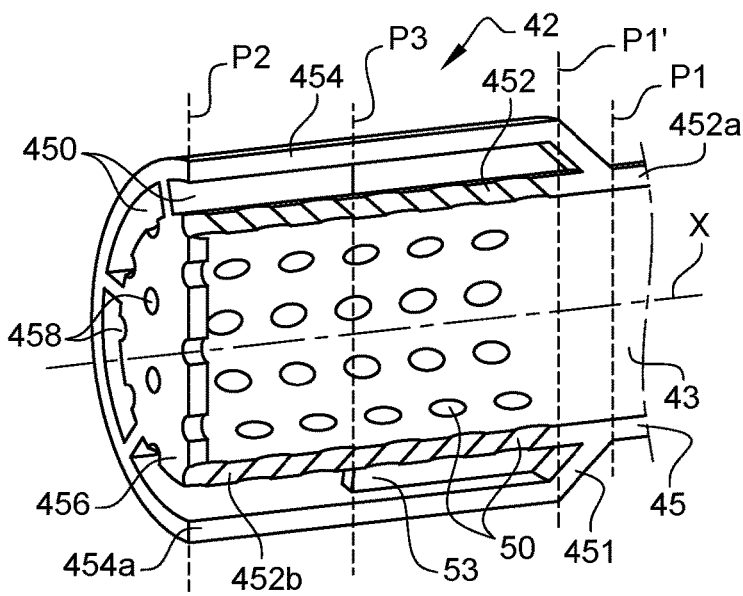
FIG. 6*a* is a partial schematic view in axial section of an end piece of a tube according to a fourth embodiment of the disclosure.
Figure 6B:
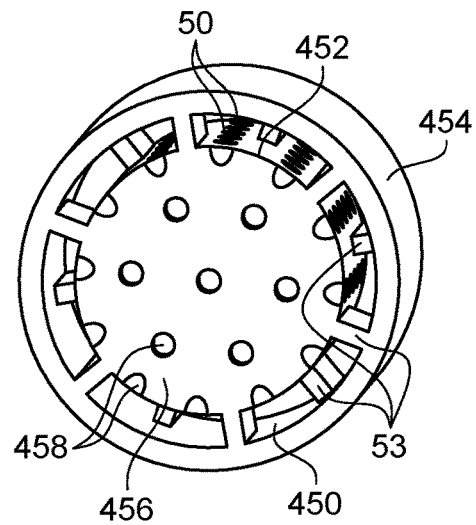
FIG. 6*b* is a schematic front perspective view of the end piece in FIG. 6*a*.

FIGS. 3*a* to 3*c* represent a first embodiment of a pre-vaporization tube 4 according to the disclosure, for a turbine engine combustion chamber 1. FIGS. 4*a* and 4*b* illustrate a second embodiment of this tube 4. Similarly, FIGS. 5*a*, 5*b* and 6*a*, 6*b* illustrate, respectively, third and fourth embodiments of this tube 4.

Referring to FIG. 3*a*, the tube 4 comprises a generally elongated main body 40 and connected to two end pieces 42. In the example shown, the end pieces 42 are bent substantially at right angles.

The main body 40 defines a first internal longitudinal conduit 41 in which a fuel injector 3 is intended to be mounted. This main body 40 comprises a first longitudinal end 40*a* for attachment to a chamber wall 13 and a second longitudinal end 40*b*.

The end pieces 42 are located at the level of the second longitudinal end 40*b* and define second internal conduits 43. In the example shown, the second internal conduits 43 are also bent. Each end piece 42 comprises a first portion 44 and a second portion 45. The first portions 44 are substantially coaxial and diametrically opposed and the second portions 45 are substantially parallel and oriented in a same direction. Each first portion 44 is in fluid communication with the first conduit 41. Each second portion 45 is intended to open into the chamber 1.

The terms "fluid" or "fluid communication" are used in this demand to refer to a liquid (e.g., a fuel) or a gas (e.g., the air) or a mixture of the two (an air-fuel mixture in the case of the combustion chamber).

According to the disclosure, the second portions 45 of the end pieces 42 each comprise an internal cylindrical wall 452 and an external cylindrical wall 454.

The cylindrical walls 452, 454 of each of the end pieces 42 are coaxial and extend about an axis X of revolution. The cylindrical walls 452, 454 define an annular cavity 450 between them that also extends around the axis X.

The cylindrical walls 452, 454 of each of the end pieces 42 are connected together by a frustoconical wall 451. The internal 452, external 454 and frustoconical 451 walls are integral with the tube 4. This frustoconical wall 451 comprises an internal peripheral edge connected to the internal wall 452 via its first connecting end 542a on the side of the first portion 44. This internal edge of the wall 451 passes substantially through a plane P1 and is located on the downstream side of the first portion 44 and of the main body 40 of the tube 4. The frustoconical wall 451 further comprises an external peripheral edge connected to the external wall 454. This external edge of the wall 451 passes substantially through a plane P1'. The planes P1 and P1' are substantially perpendicular to the axis X. In the example, the planes P1 and P1' are offset so as to achieve the frustoconical shape to the wall 451.

Each of the internal walls 452 of the end pieces 42, from upstream to downstream, extends longitudinally about the axis X between the first connecting end 452a to the first portion 44 and a second longitudinal connecting end 452b to a transverse wall 456.

In reference to FIGS. 3b and 3c, each of the internal walls 452 defines an internal passage corresponding to a portion of the second internal conduit 43 of the second portion 45. This internal passage of the internal wall 452 is in fluid communication with the first internal conduit 41 through this portion of the second internal conduit 43.

Each of the internal walls 452 comprises orifices 50 configured to provide a fluid communication (preferably an air-fuel mixture intended to supply the combustion chamber) between the internal passage of the internal wall 452 and the annular cavity 450. These orifices 50 thus open into the cavity 450 along a direction D of fluid flow. The orifices 50 may be evenly and circumferentially distributed around the internal wall 452. These orifices 50 may be inclined, from upstream to downstream, radially outward from the direction D and the axis X. The orifices 50 may be distributed substantially from the frustoconical wall 451 to the second end 452b. The orifices 50 can have a diameter of less than 1 mm. In the examples, the orifices 50 are arranged to form longitudinal rows of orifices 50.

Each of the internal walls 452 is thus connected to the transverse wall 456 arranged via its second end 452b. The transverse wall 456 substantially passes through a plane P2 that is perpendicular to the axis X. This transverse wall 456 allows the internal section of the internal wall 452 to be at least partially obstructed. The transverse wall 456 is pierced with second orifices 458 configured to provide a fluid passage from the first internal conduit 41 through the second internal conduit 43. These orifices 458 are evenly distributed across the transverse wall 456. The second orifices 458 have, for example, diameters equivalent to or smaller than the diameters of the first orifices 50. This transverse wall 456 and the second orifices 458 are intended to open into the chamber 1.

Each of the external walls 454 of the end pieces 42, from upstream to downstream, extends longitudinally about the axis X between the external edge of the frustoconical wall 451 and its free longitudinal end 454a. This free end 454a passes substantially through the plane P2, so as to align it with the transverse wall 456. The free end 454a is intended to open into the primary area of the chamber 1. The external wall 454 comprises an internal surface intended to receive impacts of fluid jets F2 from the internal passage of the internal wall 452 through the orifices 50.

The annular cavity 450 of each of the end pieces 42, from upstream to downstream, extends about the axis X substantially between the planes P1 and P2. This cavity 450 may have a fluid outlet section that has an annular shape. The radial distance between the internal 452 and external 454 wall forming the cavity 450, may be substantially 2 to 8 times smaller than the internal diameter of the internal wall 452. The cavity 450 is intended to open into the chamber 1.

The tube 4 of the second, third, and fourth embodiments differs from the tube 4 of the first embodiment in that a plurality of fluid flow disruptors are present in the annular cavity 450.

The use of disruptors allows to create turbulences in the fluid flow D. This improves the impacts of fluid jets F2 on the internal surface of the external walls 454.

In reference to the second embodiment (FIGS. 4a and 4b), the disruptors are longitudinal webs 51'. These webs 51' define longitudinal channels 51 between them. Each of the webs 51' is connected from the internal wall 452 to the external wall 454. The webs 51' extend substantially between the planes P1 and P2 and are evenly and circumferentially distributed in the cavity 450.

In the examples, a longitudinal row of the first orifices 50 opens into each of the channels 51.

In reference to the third embodiment (FIGS. 5a and 5b), the disruptors are spikes 52. Each of the spikes 52 extends radially from the internal wall 452 to the external wall 454. These spikes 52 are evenly distributed circumferentially around the axis X of each of the second portions 45.

In the examples, the spikes 52 form longitudinal rows that alternate circumferentially with the longitudinal rows of the first orifices 50.

With reference to the fourth embodiment (FIGS. 5a and 5b), the disruptors are fins 53. Each of the fins 53 also extends radially from the internal wall 452 to the external wall 454. These fins 53 extend partially along the cavity 450.

In the examples, one of the fins 53 extends from the frustoconical wall 451 (i.e., along the plane P1) to approximately half the length of the cavity 450. This half of the length of the cavity 450 is substantially located in a plane P3 that is parallel to the planes P1 and P2. An adjacent fin 53 extends from ends 452b, 454a (i.e., along plane P2) to that half length of the cavity 450 (i.e., along the plane P3).

In addition, the fins 53 delimit between them a longitudinal row of the first orifices 50.

The tube 4 according to the disclosure can be made by additive manufacturing.

The external wall 454 and/or the transverse wall 456 may comprise a ceramic coating intended to increase the thermal resistance of the walls in direct contact with the primary area, when the tube 4 is mounted in the combustion chamber 1.

Figure 7:
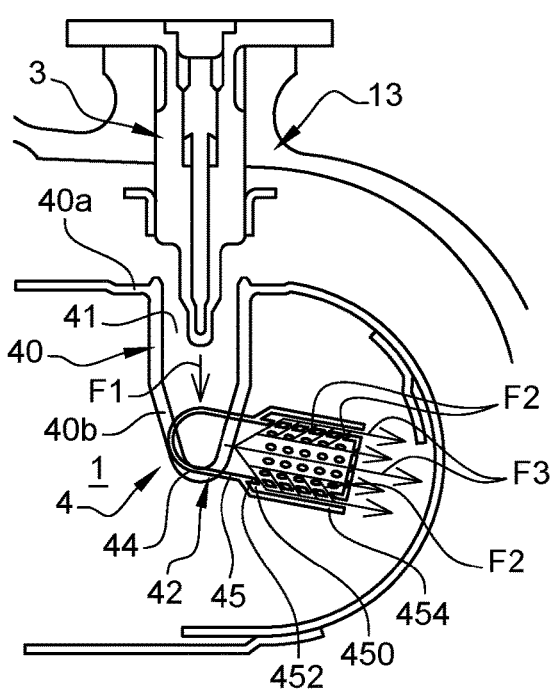
FIG. 7 is a schematic axial cross-sectional view of the pre-vaporization tube in a turbine engine combustion chamber according to the disclosure.

In reference to FIG. 7, we will now describe the tube according to the disclosure installed in an aircraft turbine engine combustion chamber, and discuss its operation.

The arrangement of tubes 4 in chamber 1 has been described in general terms in the foregoing with reference to FIGS. 1 and 2.

In particular, the first internal conduit 41 of the tube 4 is intended to receive an air-fuel mixture from the fuel injector 3.

The combustion of the air-fuel mixture is initiated via one or more ignition devices (not shown) attached to the external wall 12 of the chamber 1.

During this combustion, the walls of the tube 4 heat up and the fuel projected by the injector 3 on the walls of the tube evaporates. The air-fuel mixture enters the chamber 1 through the end pieces 45 of the tube 4.

In order to protect the end pieces 45 in particular from the thermal radiation generated by the combustion, the end pieces 45 each comprise a double wall formed by the internal wall 452 pierced with first orifices 50 and the external wall 454. These internal 452 and external 454 walls thus delimit the annular cavity 450 between them. Furthermore, the internal wall 452 is connected, via its second end 452b, to the transverse wall 456 pierced with second orifices 458.

In reference to FIGS. 3b, 3c and 7, the arrows F1, F2, F3 in the figures represent a path and a direction D of flow of the air-fuel mixture within the end pieces 45. An air-fuel mixture F1, coming from the first internal conduit 41, passes through the second internal conduits 43 to spread in the chamber 1 through the annular cavities 450 and the second orifices 458.

To do this, on the one hand, the air-fuel mixture F1 passes through the first orifices 50 into the cavities 450 and then into the chamber 1. This air-fuel mixture F1 generates air jets F2 obtained at the passage of the first orifices 50. This allows the external walls 454 of the end pieces 42 to be cooled by air jets F2 impacts.

On the other hand, the air-fuel mixture F1 passes through the second orifices 458 and into the chamber 1, so as to supply the chamber directly with fuel and air F3.

The impact of air jets F2 cooling the external walls 454, can be enhanced by tilting the first orifices 50 along the flow direction D of the mixture and passing the mixture F1 through the second orifices 458.

Thus, the air-fuel mixture flowing through the tube 4 according to the disclosure is able to effectively cool the entire external walls 454 of the end pieces 42, and then be guided into the chamber 1.

The tube according to the disclosure brings several advantages which are in particular to:
- optimize the service life of the pre-vaporization tubes by improving the cooling of the end pieces;
- keep the pre-vaporization function of the tubes;
- limit the cost of maintenance of the tubes and of the combustion chamber;
- easily adapt to existing gas generators.

Overall, this proposed solution is simple, effective and economical to build and assemble on an aircraft turbine engine, while providing an optimal cooling and an improved service life of the pre-vaporization tubes of a combustion chamber.

The invention claimed is:

1. A pre-vaporization tube for combustion chamber of a turbine engine, in particular for an aircraft, comprising:
   a main body having an elongate shape and defining a first internal longitudinal conduit configured to have a fuel injector mounted therein, said main body comprising a first longitudinal end configured to be fastened to a wall of the combustion chamber and a second longitudinal end,
   at least two end pieces arranged at a level of said second longitudinal end and defining second internal conduits, said end pieces respectively comprising first portions, which are substantially coaxial and diametrically opposed, and second portions, which are parallel and oriented in a same direction, said first portions being in fluid communication with said first internal longitudinal conduit and said second portions being configured to open into the combustion chamber, wherein said second portions each comprise two coaxial cylindrical walls, respectively, internal and external, which define between them an annular cavity, and the internal wall defines an internal passage and comprises first orifices placing the internal passage in fluid communication with said annular cavity.

2. The tube of claim 1, wherein said annular cavity has an annular shaped fluid outlet section.

3. The tube according to claim 1, wherein said internal wall is connected at its longitudinal end opposite said first portions to a transverse wall comprising second fluid passage orifices.

4. The tube according to claim 3, wherein said transverse wall extends in line with a free longitudinal end of the external wall.

5. The tube according to claim 1, wherein said internal and external walls are connected to each other by a frusto-conical wall, on the side of said first portions.

6. The tube according to claim 1, wherein said first orifices are inclined, from upstream to downstream, radially outwards with respect to a direction of fluid flow in said second portions and with respect to longitudinal axes of these second portions.

7. The tube according to claim 1, wherein said annular cavity further comprises a plurality of fluid flow disruptors, such as channels, spikes, and/or fins.

8. The tube according to claim 7, wherein said disruptors extend radially between said internal and external walls and are regularly distributed around longitudinal axes of the second portions.

9. The tube of claim 7, wherein said fluid flow disruptors are each located between two adjacent first orifices.

10. The tube of claim 3, wherein said external wall and said transverse wall are at least partially coated with a ceramic material.

11. The tube according to claim 1, wherein the end pieces are bent.

12. The tube of claim 11, wherein the end pieces are bent at right angles.

13. The tube according to claim 1, wherein said second portions comprising said external walls each have an external diameter greater than an external diameter of said first portions, respectively.

14. A combustion chamber of a turbine engine, comprising at least one pre-vaporization tube according to claim 1.

15. The combustion chamber of claim 14, wherein the turbine engine is an aircraft turbine engine.

16. The tube of claim 1, wherein said first orifices are formed through the internal wall and configured to provide fluid communication between the internal passage and the annular cavity.

17. A pre-vaporization tube for combustion chamber of a turbine engine, in particular for an aircraft, comprising:
   a main body having an elongate shape and defining a first internal longitudinal conduit configured to have a fuel injector mounted therein, said main body comprising a first longitudinal end configured to be fastened to a wall of the combustion chamber and a second longitudinal end,
   at least two end pieces arranged at a level of said second longitudinal end and defining second internal conduits, said end pieces respectively comprising first portions, which are substantially coaxial and diametrically opposed, and second portions, which are parallel and oriented in a same direction, said first portions being in fluid communication with said first internal longitudinal conduit and said second portions being configured to open into the combustion chamber,
   wherein said second portions each comprise two coaxial cylindrical walls, respectively, internal and external, which define between them an annular cavity, and the internal wall defines an internal passage and comprises first orifices placing the internal passage in fluid communication with said annular cavity, wherein said annular cavity has an annular shaped fluid outlet section.

\* \* \* \* \*